FIG. 1

INVENTOR.
FRANCIS J. MURPHY
ALPO J. TOKOLA
BY
ATTORNEY

INVENTOR.
FRANCIS J. MURPHY
ALPO J. TOKOLA
BY
ATTORNEY

INVENTOR.
FRANCIS J. MURPHY
ALPO J. TOKOLA
BY
ATTORNEY

INVENTOR.
FRANCIS J. MURPHY
ALPO J. TOKOLA
BY
*James E. Tooney*
ATTORNEY

July 4, 1967

F. J. MURPHY ETAL 3,328,969

APPARATUS FOR DRIVING PILES

Filed Nov. 2, 1964

INVENTOR.
FRANCIS J. MURPHY
BY ALPO J. TOKOLA

James E. Toomey
ATTORNEY

FIG. 11

July 4, 1967     F. J. MURPHY ET AL     3,328,969
APPARATUS FOR DRIVING PILES Filed Nov. 2, 1964     7 Sheets-Sheet 7

INVENTOR.
FRANCIS J. MURPHY
ALPO J. TOKOLA
BY
*James E. Toomey*
ATTORNEY

United States Patent Office 3,328,969
Patented July 4, 1967

3,328,969
APPARATUS FOR DRIVING PILES
Francis J. Murphy, San Francisco, and Alpo J. Tokola, Lafayette, Calif., assignors to Kaiser Steel Corporation, Oakland, Calif., a corporation of Nevada
Filed Nov. 2, 1964, Ser. No. 408,089
9 Claims. (Cl. 61—535)

This invention relates to an apparatus for supporting a pile, such as one made of metal, above the surface and for driving the pile below the surface of a body of water with the pile forming a part of an overall pattern of piles making up a submerged pier and the like.

More particularly, it is concerned with providing an apparatus for individually supporting and driving one or more piles forming a portion of an overall pattern of piles making up a submerged pier and the like whereby each pile can be driven into place without the necessity of constantly reorienting the pile driving device with respect to piles previously driven to form a selected pattern of piles.

Accordingly, it is a primary purpose of the instant invention to provide an apparatus for driving piles in selected patterns without the necessity of constantly reorienting the pile driving device with respect to piles previously driven into place in order to form a selected pattern of piles.

This and other purposes and advantages of the instant invention will become more apparent from a review of the following detailed description when taken in conjunction with the appended drawings, wherein.

Figure 1:
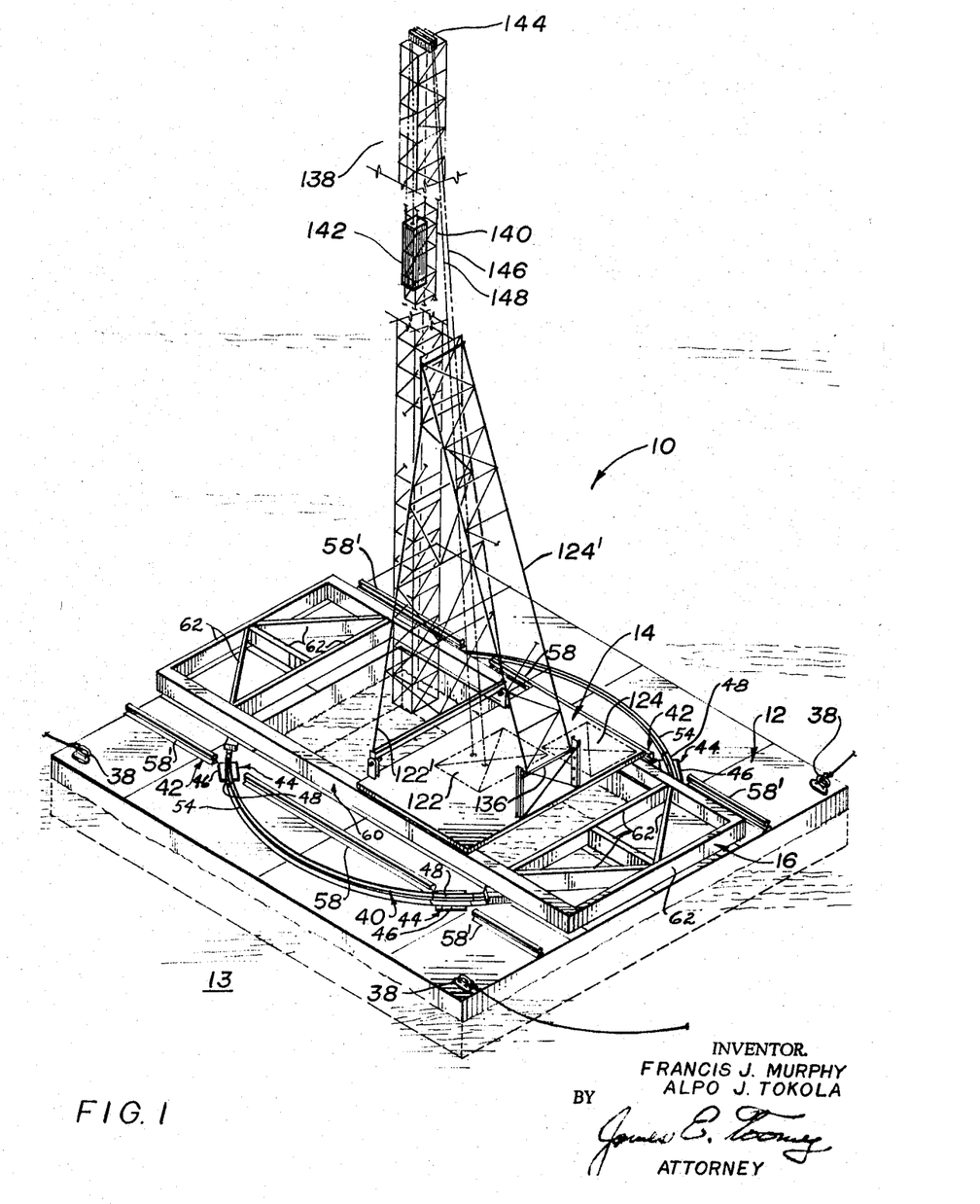
FIGURE 1 is a perspective view with parts broken away and on a reduced scale of one embodiment of a suitable apparatus for carrying out the teachings of the instant invention.
Figures 2, 10:
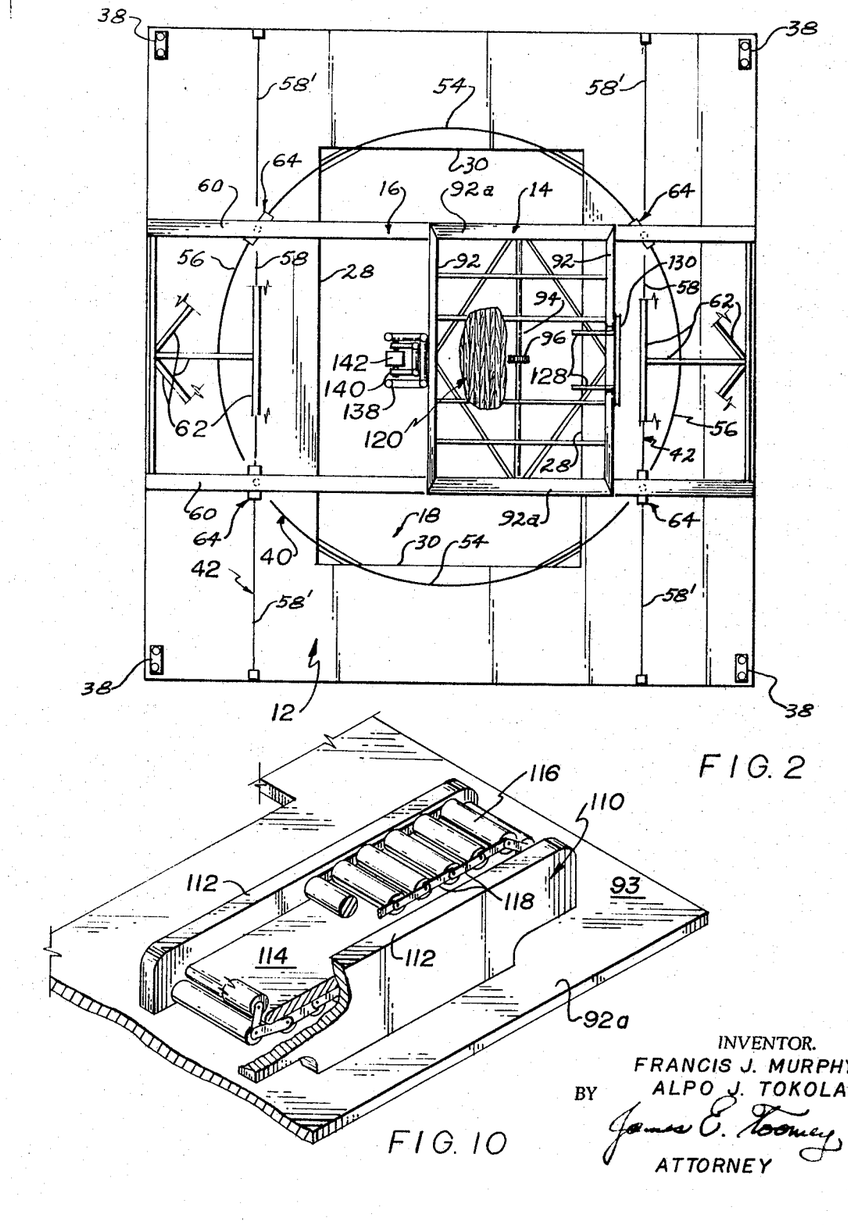
FIGURE 2 is an enlarged plan view of FIGURE 1 with parts broken away and with certain parts rotated 90° counterclockwise relative to their position as shown in FIG. 1 and illustrates further details of the apparatus.
FIGURE 10 is an enlarged perspective view of a bearing means associated with the carriage portion of the apparatus shown in FIG. 6.
Figure 3:
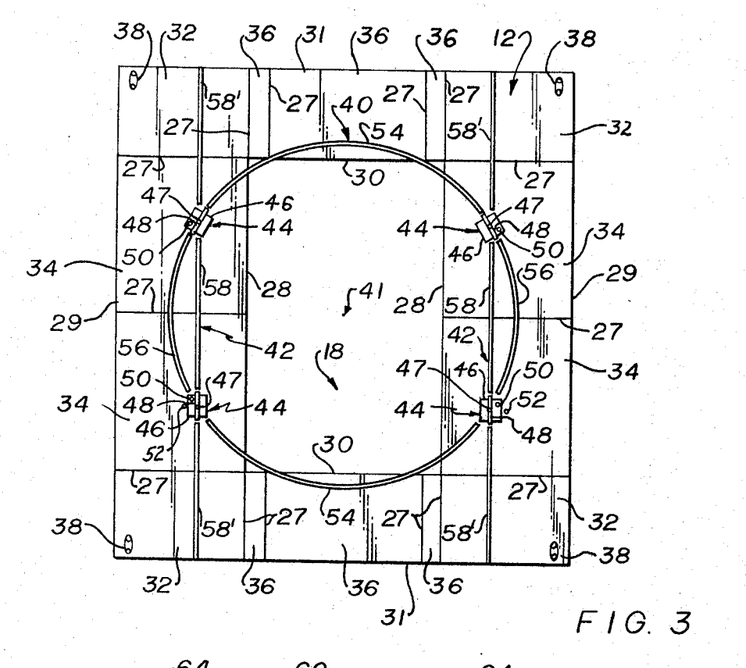
FIGURE 3 is a plan view similar to FIG. 2 but with additional parts broken away to illustrate in further detail one portion of the apparatus of FIG. 1.
Figure 4:
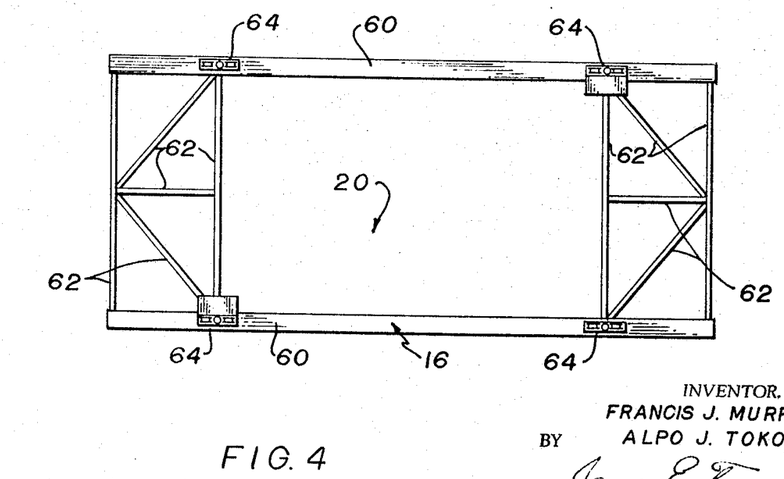
FIGURE 4 is a plan view of another portion of the apparatus of FIG. 1.
Figure 12:
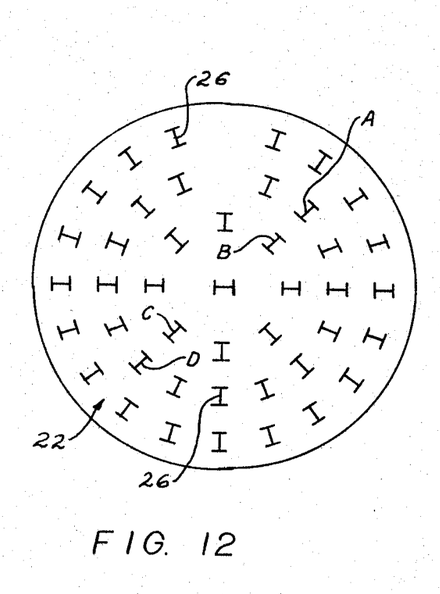
FIGURES 12 and 13 are diagrammatic plan views on a reduced scale of representative cross-sectional patterns of piles that can be used in carrying out the instant invention.
Figure 13:
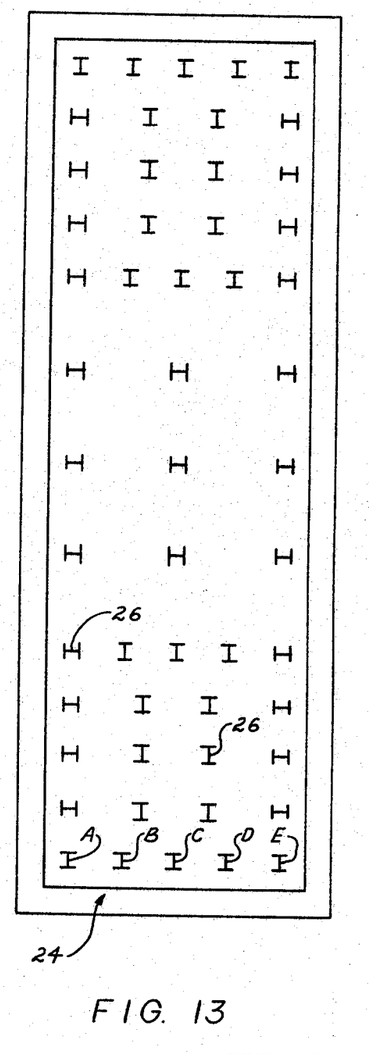

With further reference to the drawings and in particular FIGS. 1 and 2, a preferred form of apparatus 10 that can be used in carrying out the teachings of the instant invention generally comprises a unique combination of members, namely: a buoyant barge 12 anchorable in any desired position on the surface of a body of water 13, a pile driving carriage 14 and an intermediate frame member 16 for use in mounting the carriage 14 on the barge member 12. The uniquely combined members 12, 14 and 16 are made up of plate members and conventional I-beams and channel members and are desirably welded together into the configuration shown in FIG. 1. The barge 12 and the intermediate frame member 16, as best shown in FIGS. 3 and 4, respectively, have an opening therethrough to define a closed aperture 18 and 20 of similar shape, the purpose and details of which will become more apparent hereinafter. It is to be understood that this closed aperture can either be circular or have any desired polygonal shape. One of the purposes of the apparatus 10 of the instant invention is to hammer-in piles of a given length in a conventional fashion to make up a cross-sectional pattern of piles, such as is shown in FIGS. 12 and 13, which constitute a part of a submerged pier member which is disposed within and above the earth formation beneath the body of water 13. FIGS. 12 and 13 indicate different cross-sectional patterns of piles, wherein the piles are preferably in the shape of I-beams, some of which are indicated by the reference number 26. Thus, when the barge 12 of the apparatus is anchored in a position such as shown in FIG. 1 the closed aperture 18 of the barge 12 encompasses a surface portion of the body of water 13 within which the preselected pattern of piles is to be located. The carriage 14 of the pile driving apparatus not only individually supports each pile 26 of a given length in a predetermined angular position relative to the pattern of the submerged pier member to be constructed, but it also cooperates with the intermediate frame member 16 in positioning each pile whereby each pile can assume its proper position within the pattern of piles making up a submerged pier member, such as that illustrated in FIGS. 12 or 13. Once each pile 26 is properly positioned within the apparatus 10 of the instant invention, it can be driven in a conventional fashion into the underlying earth formation. Accordingly, as hereinafter described, the purposes and advantages of the unique combination of the anchored barge 12, pile driving carriage 14 and intermediate frame member 16 in the apparatus 10 for carrying out the teachings of the instant invention will become more apparent.

The barge 12 best shown in FIG. 3 is advantageously composed of a series of plate members welded together in appropriate fashion to define a series of closed compartments surrounding the closed aperture 18. In one embodiment of the invention, the plates welded together in the configuration shown define a barge of rigid structure of rectangular shape wherein the closed aperture 18 is concentrically located therein and surrounded by parallel interconnecting inner side surfaces 28 and 30. The inner compartments indicated by the lines 27 extending between the inner and outer side surfaces 28 and 30 and 29 and 31 in FIG. 3 respectively define compartments arranged in the manner shown to function as ballast compartments 32, fresh water compartments 34 and fuel tank compartments 36. These compartments, 32, 34 and 36 contribute to the stability of the barge in supporting the overall weight of members 14 and 16 superimposed thereabove. It is to be here observed that the fresh water tanks 34 supply water to the steam generator for the generation of steam to energize the hammer on the pile driving carriage 14 while the oil tanks 36 supply fuel oil to necessary power driven equipment (not shown) located on the apparatus 10. It is to be understood, however, that the ballast, fresh water and fuel compartments 32, 34 and 36 can be arranged in any pattern other than shown. Further, the particular manner for arranging piping to pump fluid into or out of any compartment is well known in the art.

Once the barge 12 has been located in position such that the closed aperture 18 encompasses a surface portion of the body of water 13 that is in alignment with the bottom into which the piles are to be driven in a selected pattern, the barge 12 can be anchored in position at its four corners in a suitable manner. To this end eye-shaped members 38 are secured to the four outer corners of the barge by welding in FIG. 1. A suitable anchor cable is drawn through these anchor members 38 whereby the barge is firmly anchored into position at all four corners. To accurately anchor the barge in its position in FIG. 1, appropriate surveyor instruments (not shown) can be used on the surface of the barge 12 or on fixed reference points such as an adjacent bridge structure or suitable land marks in a well known manner to sight-in the barge into a desired position to be anchored.

The exposed surface of the buoyant anchored barge 12 in FIGS. 1–3 has both circular and parallel track means advantageously affixed thereto which are adapted to be engaged by suitable means on the intermediate frame member 16 to enable movement of the intermediate frame member 16 in arcuate as well as linear paths relative to the barge member 12. The circular track 40 is suitably affixed to the exposed surface of the barge 12 in concentric relation with the intersection at point 41 of the major and minor axes of the closed aperture 18 in FIG. 3. The pair of spaced longitudinal tracks 42 are affixed by welding to the exposed surface of the barge 12. Tracks 42 are arranged so as to be parallel to each other as well as to the longer side surfaces 28 which define a part of the closed aperture 18. In addition, the spaced parallel tracks 42 are preferably affixed as shown generally inside the circumferential extent of the circular track 40.

To enable alternate alignment with either the parallel tracks 42 or the circular track 40, a series of switch means 44 are arranged to be pivotally mounted to the exposed surface of the barge 12 at the points of intersection of the circular and longitudinal tracks 40 and 42. Each switch means 44 comprises a plate member 46 pivotally mounted by a pin (not shown) in a conventional manner to the exposed surface of the barge 12 in axial alignment with the respective point of intersection 47. The plate member 46 has a track section 48 affixed thereto and adapted to be alternately aligned with either the circumference of the circular track 40 or the longitudinal extent of the parallel tracks 42. Such alignment is accomplished by pivoting the pivotally mounted plate member 46 to one of two positions wherein for the purpose of illustration the two upper switch means 44 in FIG. 3 are shown as being in alignment with the circumference of the circular track 40 while the two lower switch means 44 are shown as being in alignment with the longitudinal tracks 42.

To accurately pivot each switch means 44 between the alternate alignable positions heretofore described a circular opening 50 is provided adjacent one of the corners of each plate member 46 whereby opening 50 is adapted to be in alignment with one of the two corresponding openings 52 (only one of which is shown) provided in the exposed surface of the barge adjacent the point of intersection 47 where each switch means 44 is pivotally mounted. Thus, each of the lower switch means 44 in FIGURE 3 has its opening 50 in alignment with the inner opening 52 (not shown), for passage therethrough of a pin (not shown) in a conventional fashion to lock each switch means 44 in alignment with the associated longitudinal track 42. When the switch means 44 is pivoted upon release of the pin from the inner opening 52, each of the switch means 44 can be pivoted into alignment with the circular track 40 as shown in the upper portion of FIG. 3 whereby the pin can now be passed through the opening 50 in the plate member 46 and into the outer opening 52 to thereby lock each of the switch means into alignment with the circular track 40. By virtue of the switch means 44 located at the points of intersection 47 of the parallel and circular tracks 40 and 42, it is obvious that the circular track 40 is divided into pairs of equal arcuate sections 54 and 56. The pair of circular sections 54 is of greater arcuate extent that the other pair of circular sections 56. The longitudinal tracks 42, of course, are divided into a series of intermediate and outermost sections 58 and 58′.

The intermediate frame member 16, as best shown in FIG. 4, comprises a rectangular frame made up of I-beams and channel members welded together in the configuration shown to define the closed aperture 20 which is adapted to be superposed upon the aperture 18 of the barge. Parallel I-beams 60 are interconnected at their ends by a series of brace members 62 made up of I-beams and channel members arranged in the pattern in FIG. 4 to define a rigid intermediate frame member 16. The parallel inner side edges of the I-beams 60 and the parallel inner side edges of the longitudinally spaced innermost beam members 62 are interconnected with each other to define the closed aperture 20 wherein it is advantageously of similar rectangular shape to the closed aperture 18 of the barge 12 aforedescribed.

Figures 7, 8, 9:
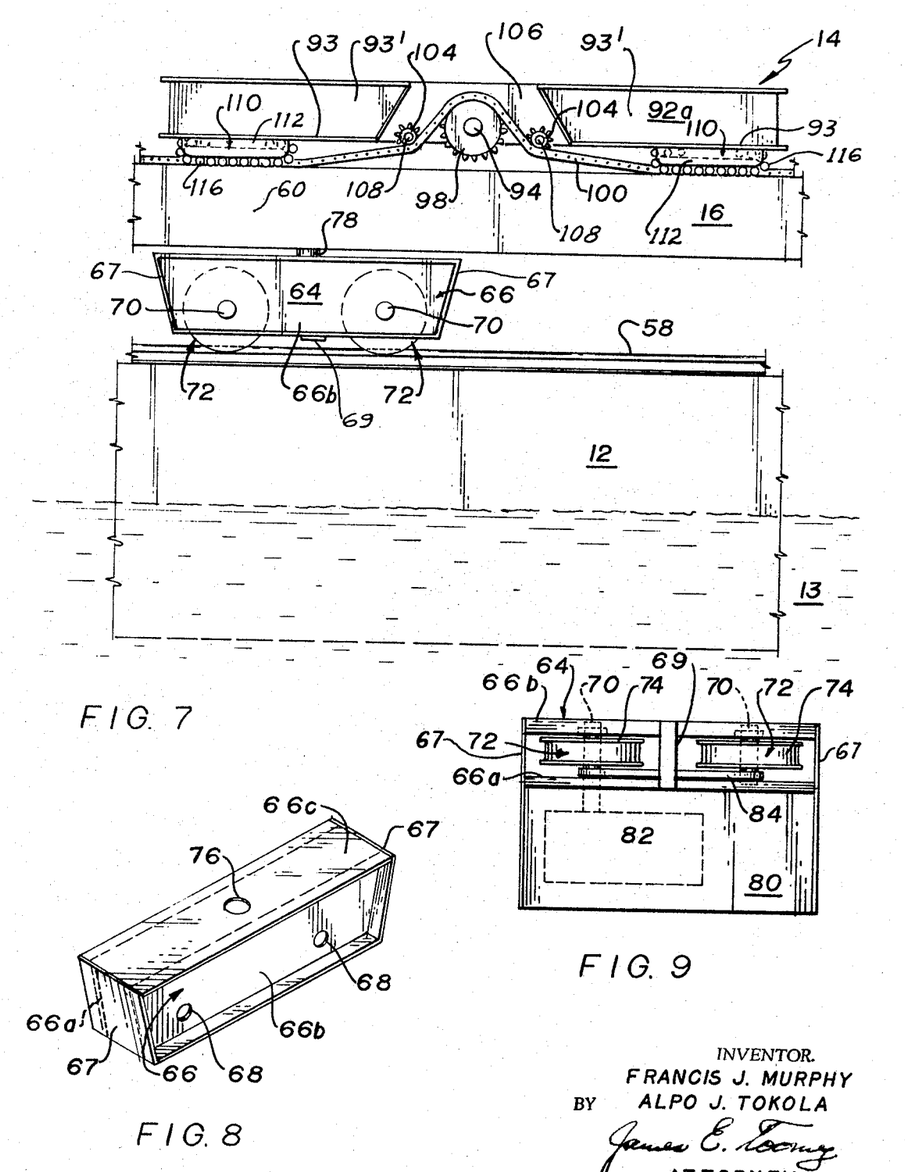
FIGURE 7 is an enlarged fragmentary elevational view with parts broken away of the drive mechanism for the pile driving carriage of the apparatus shown in FIG. 1.
FIGURE 8 is an enlarged perspective view of certain of the parts of the portion of the apparatus shown in FIG. 4.
FIGURE 9 is an enlarged plan view of one of the parts associated with a frame portion of the apparatus in FIG. 4.

The frame member 16 is adapted to alternately engage the circular and parallel tracks 40 and 42 by selective pivotal movement of the switch means 44 in cooperation with wheel means pivotally mounted to the frame 16 whereby the frame member 16 can move in opposite directions relative to the barge 12 and its aperture 18 in alternate arcuate and linear paths. To this end a plurality of pivotally mounted wheel housings 64 are pivotally affixed to the lower flange of the I-beams 60. It is to be noted here that in pivotally affixing these wheel means 64 to the I-beams 60 the pivotal axes of the wheel means 64 are expediently arranged to axially align with the pivotal axes of the switch means 44 depending upon the position of the frame member 16 relative to the barge 12, as will become more apparent hereinafter. Referring to FIG. 8 each wheel means 64 generally comprises a plate member 66 that has been formed into U-shape having spaced parallel wall portions or flanges 66a and 66b interconnected by a back portion 66c. The parallel wall portions 66a and 66b have a pair of longitudinally spaced axially aligned openings 68 therethrough. Each of the stub shafts 70 has a wheel 72 secured intermediate its ends in an appropriate manner. The wheel has a recessed rim generally indicated at 74 which is adapted to engage the circular and parallel tracks 40 and 42 as well as track section 48 of the switch means 44. The ends of each shaft 70 are then assembled into the aligned openings 68 to complete the frame 66. To pivotally mount each wheel means 64 an opening 76 is provided intermediate the longitudinal axis of the interconnecting back portion 66c of the plate member 66 whereby a pin 78 protruding from the surface of the lower flange of the I-beam 60 is adapted to be aligned with and pass through the opening 76 for pivotally mounting the wheels 72 to the frame 16.

It is to be observed that the longitudinal distance extending between the pair of wheels 72 for each wheel means 64 is so proportioned relative to the longitudinal extent of the track section 48 on each switch means 44 whereby, when all the wheel means 64 are in axial alignment with their associated switch means 44, the wheel means 64 can be selectively switched by pivotal movement of the associated switch means 44 into alternate alignment with the circular and parallel track means 40 and 42 in FIGS. 2 and 3. The formed plate member 66 can be reinforced by end plates 67 extending across the longtudinal ends of the flanged and back portions 66a, 66b and 66c as well as by an intermediate strut member 69 extending across the free longitudinal edges of the wall portions 66a and 66b in FIG. 9.

Although not heretofore mentioned, two of the wheel means 64 function as idlers, while the other two wheel means 64 are advantageously modified to be power driven by an appropriate motor means such as an air motor. Referring to FIG. 9, one of the wall or flange portions, for example, flange portion 66a of the formed plate member 66 has a plate 80 affixed thereto extending laterally outward of this flange portion 66a. As shown diagrammatically by dotted lines, the top surface of the lateral wall 80 has affixed thereto an air motor 82 which is adapted to be connected to an end of one of the stub shafts 70 in a suitable manner. The wall portions 66a and 66b of the plate member 66 of the power driven means 64 are desirably spaced further from each other to incorporate a conventional chain belt 84 and appropriate gear means (not shown) which effectively transmits power to and from the motor driven stub shaft 70 to the other stub shaft 70 within a given wheel means 64. Thus, when the wheel means 64 are in engagement with the circular or parallel track means 40 or 42 energization of the air motor 82 by conventional control means (not shown) rotates the wheels 72 of a power driven wheel means 64 to thereby cause corresponding movement of the frame member 14 in alternate circular and linear directions relative to the aperture 18 of the barge 12 as the case may be.

Whenever it is desired to switch the wheel means 64 from the circular track 40 to the parallel tracks 42 or vice-versa by utilization of the switch means 44, each wheel means 64 can be pivoted by a conventional winch means (not shown) in order to move the wheel means into alignment with the circular track 40 or parallel tracks 42 when the pivotal axis of the wheel means 64 is located in axial alignment with the pivotal axis of the associated switch means 44 as aforedescribed. It is further evident that the cooperative switch means 44 and wheel means 64 provide a unique arrangement for controlled movement of the frame member 16 relative to the barge 12 in alternate arcuate and linear paths.

Figures 5, 6:
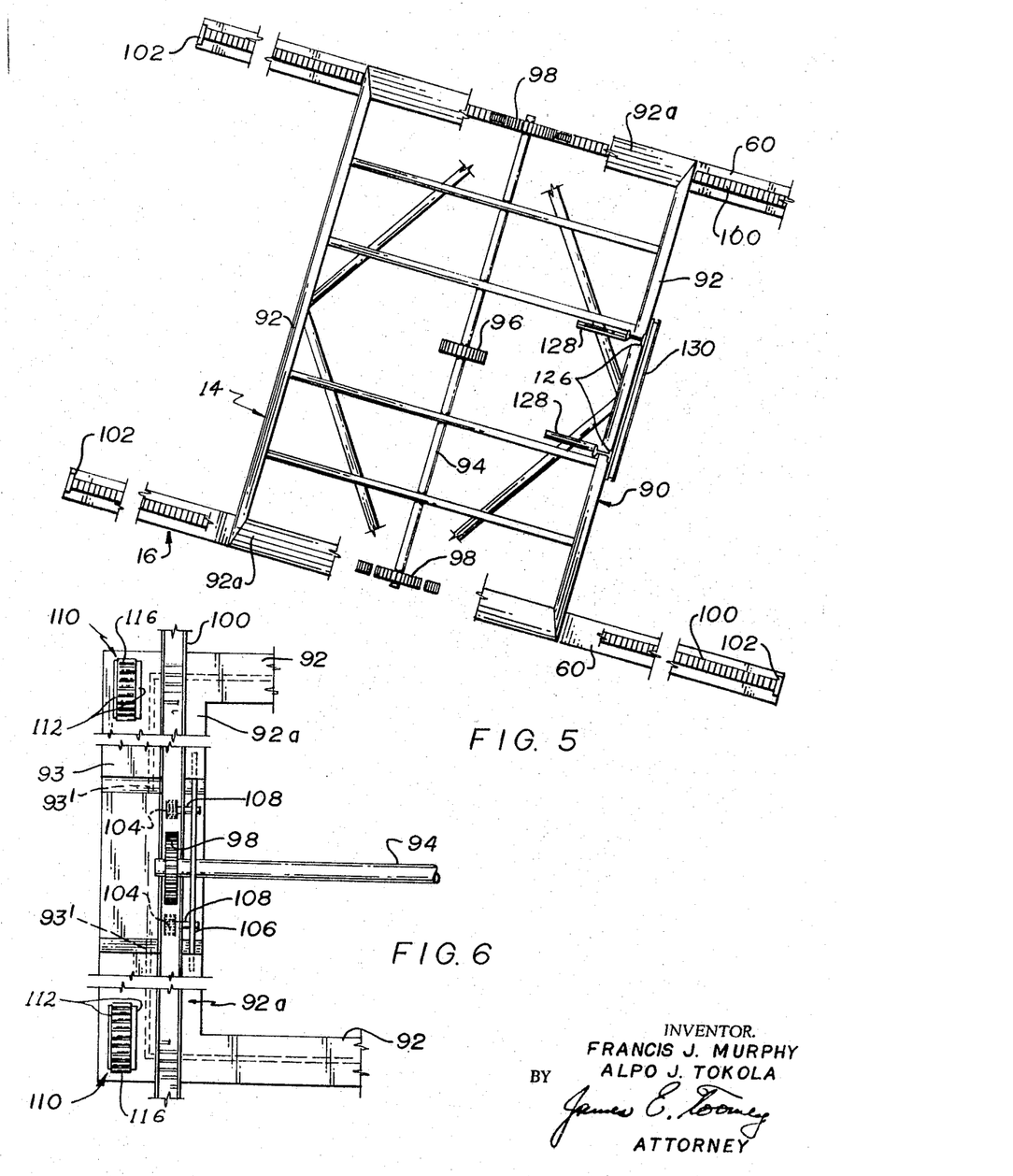
FIGURE 5 is a plan view with parts broken away and on an enlarged scale and further illustrates the relation of certain portions of the apparatus of FIG. 1.
FIGURE 6 is an enlarged fragmentary view of a portion of the undersurface of the apparatus shown in FIG. 5.

Cooperative means are advantageously disposed between the support member or carriage 14 and the frame member 16 to advantageously enable movement of the carriage 14 along a linear path relative to the exposed surface of the upper flange of the spaced I-beams 60 of the intermediate frame member 16. The carriage 14 includes a lower frame 90 best shown in FIG. 5 made up of a series of I-beam members 92 welded together in a suitable manner to define the frame having the configuration shown. The I-beams 92 are proportioned to extend across the spaced I-beams 60 of the intermediate frame member 16 and to bearingly mount a power driven shaft 94 along the longitudinal axis of the frame 90 wherein the shaft 94 has an intermediate sprocket gear 96 driven by power means (not shown) and driven sprocket gears 98 at each end of the shaft 94. A pair of suitable chains 100 of conventional design in FIG. 5 are adapted to extend along their respective exposed surface of the upper flange to the I-beams 60 of the frame member 16 wherein the end extremities of the chains 100 are affixed in a desirable manner to the I-beams 60 by brackets generally indicated at 102. An intermediate portion of each chain 100 is adapted to be wound partially around the lower portion of a pair of the spaced idler sprocket gears 104 best shown in FIG. 7 and rotatably affixed to each outermost lateral I-beam of the frame 90 as well as partially around the upper portion of the driven sprocket gear 98 interdisposed between the idler gears 104 on the I-beam 92a. As a result the idler sprocket gears 104 function to hold the associated chain 100 in operative engagement with the driven sprocket gear 94 in FIG. 7.

To enable mounting of idler sprocket gears 104 as well as proper support of the driven sprocket gear 98 at the end of shaft 94 a section of the lower flange 93 and a section of the web 93' for each I-beam 92a is cut away as shown in FIGS. 6 and 7 to allow free passage of the chain 100 around the underneath portion of the idler sprocket 104 as well as around the uppermost portion of the driven sprocket gear 98. By virtue of the cutting away of the web portion 93' of each I-bear 92a an offset web portion 106 of the beam 92a is arranged to extend partially beyond the extent of the cutaway section whereby the offset web portion 106 is desirably secured to the upper flange as well as the adjacent end portions of the lower flange 93. The offset web portion 106 advantageously supports the fixed inner end of each idler shaft 108 as well as the end of the rotatable shaft 94.

To minimize the friction between the carriage 14 of the pile driving apparatus and the intermediate frame member 16 whenever the carriage 14 is moved in either direction along a linear path by rotation of the shaft 94 relative to the exposed surface of the upper flange of the I-beam 60 of the frame member 16, bearing means 110 are affixed in a suitable fashion adjacent the corners of the frame 90 of the carriage 14. Referring to FIG. 6, the bearing means 110 are desirably affixed to the outer margin of the surface of the flange 93 of I-bear 92a. The bearing means 110 as best shown in FIG. 10 is a commercially available device and generally comprises a pair of plate members 112 held in spaced relation and interconnected by an intermediately disposed plate member 114. One of the longitudinal edges of plate member 114 is partially cut away and welded to the exposed surface of the lower flange 93. The intermediate plate member 114 has a plurality of roller bearings wrapped therearound. Some of the bearings are generally indicated by reference numeral 116. The bearings 116 are interconnected in endless fashion by a series of interconnecting links 118 in an appropriate manner. The roller bearings 116 are arranged to extend beyond the longitudinally free edges of the plate members 112 whereby the outer cylindrical surfaces of the roller bearings 116 are adapted to come into contact with the exposed surface of the flange 93 of carriage 14 to prevent contact between flange 93 and I-beams 60 of the frame member 16. Energization of the shaft 94 for rotation in either direction causes corresponding movement of the carriage 14 along a linear path relative to the intermediate frame member 16 by virtue of the driven sprocket gears 98 being in engagement with the associated chains 100.

Although not heretofore mentioned the upper portion of the frame 90 is covered by a deck 120 preferably made up of wood which is partly shown in FIG. 2. The deck 120 includes a support for an operator control station 122 and a steam generator 124 indicated by the dotted lines in FIG. 1. It is to be understood that the operator control station 122 includes appropriate motor and gear means for connection with the power driven sprocket gear 96 on the shaft 94 to correspondingly move the carriage 14 relative to the frame member 16 as well as appropriate means for the energization of the air motors 82 which drive wheel means 64 as well as suitable clutch and brake mechanism for stopping and locking the wheel means in the appropriate fixed positions.

Figure 11:
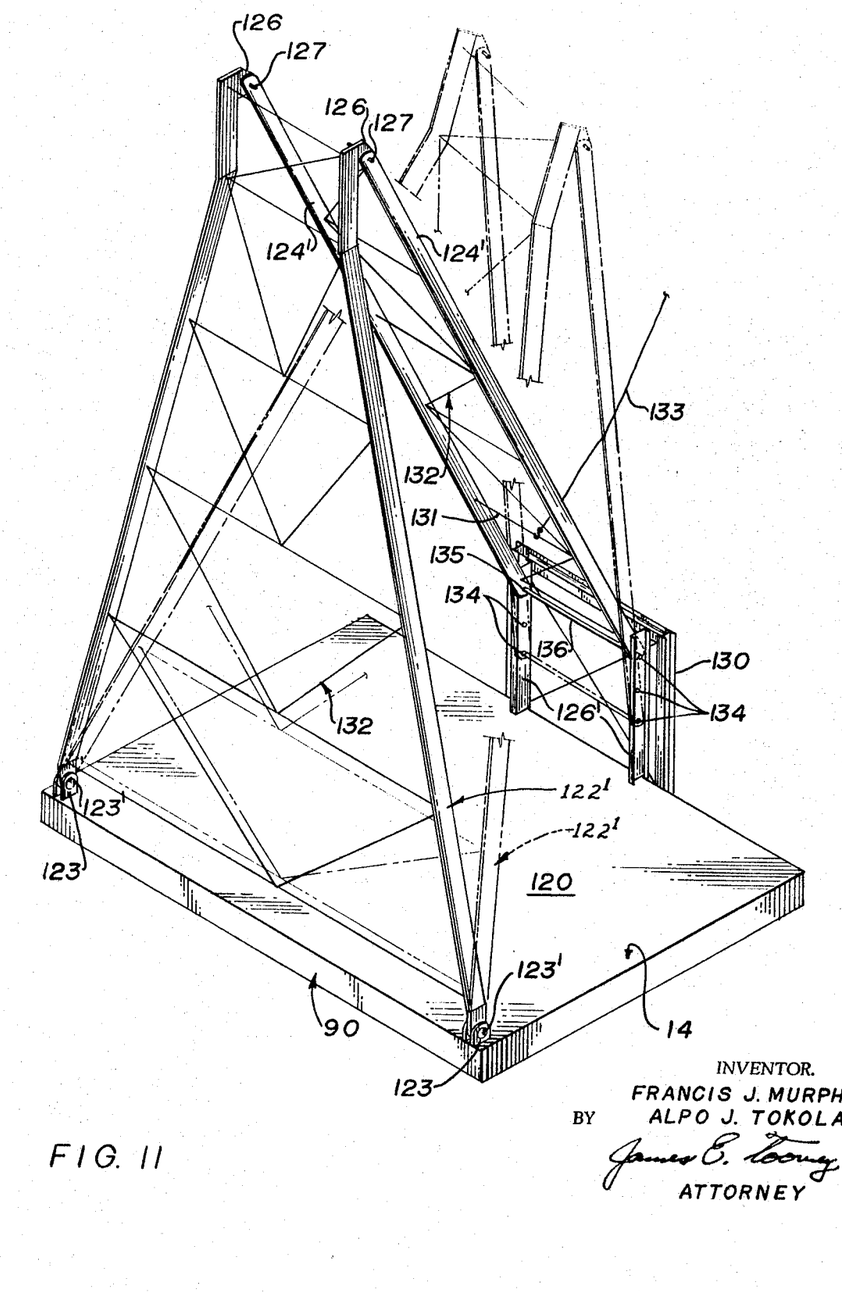
FIGURE 11 is another perspective view on an enlarged scale of FIG. 1 with certain parts broken away of the pile driving carriage of the apparatus and illustrates the adjustable angular positions of the workpiece supporting structure of the pile driving leads of the apparatus.

In FIG. 11 the A-frame 122' is shown which is pivotally mounted at its lower end to the support frame 90 by pins 123' and U-shaped brackets 123 affixed thereto in the usual manner. Similarly, the upper end of the A-frame 122' is pivotally connected to a pair of parallel spaced brace members 124' by brackets 126 and pins 127. The lower ends of the brace members 124' are adapted to be selectively positioned in one of a plurality of positions disposed along a pair of parallel spaced, vertically disposed channel members 126'. These channel members 126' are reinforced in their connection to the frame 90 of the carriage 14 by the horizontally disposed channel members 128 and vertically disposed backing member 130 which are welded to the frame 90 as shown in FIGS. 2, 5 and 11. The outer members of the A-frame 122' as well as the brace members 124' can be reinforced by the pattern of truss elements 132 in FIGS. 1 and 11.

When the lower end of the brace member 124' is positioned in one of the plurality of axially aligned openings 134 in the vertical members 126', the A-frame 122' is correspondingly pivoted about an axis passing through the brackets 123 whereby the A-frame is angularly adjusted about an angle relative to a vertical plane passing through the vertical members 126'. Thus, whenever the lower ends of the brace members 124' are in the uppermost position, openings 134 of the A-frame 122' are positioned in a generally vertical plane as represented by the solid lines in FIG. 11. However, if the lower ends of the brace members 124' are lowered so as to be in alignment with the lowermost openings 134 in the vertical members 126' then the A-frame 122' would be positioned in its greatest angular position relative to the plane passing through the members 126'. In any event, whenever the lower ends of the brace members 124' are in alignment with any of the vertically aligned openings 134 a shaft 136 is adapted to extend through the vertically aligned openings 134 of the members 126' which are in axial alignment with the openings 135 only one of which is shown at the lower end of the brace members 124' to lock the brace members 124' in their vertically adjusted position and thereby maintain the A-frame 122' in one of its angular positions with respect to the vertical plane.

The A-frame 122' is adapted to have conventional outer and inner leads of any appropriate commercial available pile driving apparatus affixed thereto. The outer leads 138 are positively affixed to the A-frame 122' while the inner leads are adapted to be suspended by a cable for relative movement within the outer leads 138. The hammer 142 thereof is adapted to be suspended by another cable for relative movement within the inner leads 140 in FIGS. 1 and 2. By virtue of the fact that the outer lead 138 is affixed to the A-frame 122' a suitable pulley block arrangement 144 is affixed to the upper end of the outer lead 138 and is adapted to guide cables 146 and 148 from the operator control station 122 at one end to be respectively connected at the other end to the inner lead 140 and the hammer 142 in a conventional fashion. Although not shown it is to be understood that appropriate power driven reel means which incorporate a brake and clutch means within the operator control station 122 are separately connected to the control ends of the cable 146 and 148 whereby the inner lead 140 can be elevated relative to the outer lead 138 to a position immediately adjacent the surface of the earth formation underneath the body of water to properly guide each pile 26 into its proper position within the pattern of the pier member to be constructed such as 22 or 24 in FIGS. 12 and 13 when the hammer 142 is lowered into contact with the upper end of the pile.

Although not heretofore mentioned appropriate flexible conduit means (not shown), can be extended from the steam generator to the hammer 142 to direct steam to the hammer 142 as well as condensate from the hammer 142 in any of its positions relative to the outer lead 138, when the hammer 142 is driving the pile 26 into the earth formation.

The A-frame 122' with the leads 138 and 140 and hammer 142 affixed thereto is usually of such an overall weight that in order to angularly adjust the A-frame 122' as aforedescribed in FIG. 11 a suitable hoist means (not shown) is required. For this purpose, the brace members 124' include at the lower end thereof a reinforced strut 131 which is adapted to be engaged by the hook and cable means 133 of the hoist whereby the A-frame 122' can be adjusted into one of its angular positions.

Since the inner lead 140 is proportioned to carry a pile 26 of given length to be driven into the submerged earth formation by engagement of the hammer 142 at the upper end of the carried pile 26, angular adjustment of the A-frame 122' beneficially enables the pile 26 carried in the inner lead 140 to be driven into the earth formation in a corresponding angular position.

By virtue of the frame member 16 being alternately moveable in opposite directions in a circular and linear path relative to the barge 12 by selective pivotal movement of the switch means 44 and wheel means 64 as aforedescribed and by virtue of the movement of the carriage 14 in opposite directions in a linear path relative to the frame member 16 by selective rotation of sprocket gears 98 in engagement with the associated chains 100 it is possible to locate any one of the piles 26 in its proper position within the cross-sectional pattern of the pier member 22 or 24 to be formed in FIGS. 12 and 13 as the case may be. This is in contrast to prior practices wherein in the case each pile or group of piles to be driven it was necessary to move the entire barge or whatever other apparatus was employed to the position of the next pile or group of piles to be driven. To relocate the entire apparatus in order to drive each pile is a time consuming operation whereas in the case of the instant invention only the frame member 16 and the carriage 14 need be moved with respect to the barge 12 to accurately position the next pile to be driven. Accordingly in the case of the instant invention all piles making up a given pattern of piles for a pier can be located in a unique and efficient manner by the use of suitable indicia or surveyor instruments with respect to fixed reference points such as a bridge or land structure.

It is to be noted here that in the art of pile driving it is customary to drive piles of given length into a submerged earth formation until it is retarded by the earth formation into which it is being driven. Thus, for each properly driven pile a certain length remains above the earth formation. The excess of the length above the earth formation is cut off by suitable means whereby the remaining length of all piles above the earth formation within the body of water as in the instant invention constitutes that portion of the pier member which is usually integrated with concrete in a known manner to fabricate a pier member of required strength.

Assuming that the circular pier member 22 of FIG. 12 is to be constructed the barge 12 is anchored into position wherein the closed aperture 18 thereof is in spaced relationship and in alignment with the location of the circular pier 22, the frame member 16 has its wheel means 64 switched into alignment with the circular track 40 as aforedescribed. For example, to initially drive the pile 26 at point A in FIG. 12 the carriage 14 is moved to its angular position by movement of the frame 16 relative to the barge 12 in a circular direction along the track 40 and the carriage 14 is then moved along the radius to point A by linear movement of the carriage 14 relative to the frame 16. Then if it is intended to drive the next pile at point B along the same radius as point A it is only necessary to move the carriage relative to the frame member 16. Similarly the piles can be driven at point C and D along the same radius as well as the remaining piles located along other radii within the circular pier member 22.

Assuming that it is desired to drive the piles 26 in the rectangular pattern of the pier member 24 in FIG. 13 then the frame member 16 has its wheel means 64 switched into alignment with the longitudinal parallel tracks 42 as aforedescribed. It is to be observed here that when the intermediate frame is aligned with the longitudinal tracks 42 the movement of the carriage 14 relative to the frame 16 is always perpendicular to the movement of the frame 16 relative to the barge 12. Consequently, if pile 26 at the left hand end of the lowermost row in FIG. 13 has been driven the next pile at point B in the lowermost row can readily be driven by mere adjustment of the carriage 14 relative to the intermediate frame 16 by actuation of the driven shaft 94 in the aforedescribed manner. Similarly, the remaining piles at points C, D and E in the lowermost row can be similarly driven as well as the remaining piles in other rows within pier member in FIG. 13.

It is to be understood that the apparatus 10 as aforedescribed is not to be limited to such an application but could be a fixed platform with a closed aperture incorporating the relatively movable frame 16 and support or carriage 14 wherein the piles could be elements elevated by a suitable hoist means mounted on the carriage 14, instead of the pile driving leads aforedescribed, into a number of positions with respect to the closed apertures 18 and 20.

An advantageous embodiment of the invention has been shown and described. It will be obvious to those skilled in the art that various changes and modifications may be made therein without departing from the spirit and scope thereof as set forth in the appended claims, wherein what is claimed is:

1. An apparatus for use in driving and anchoring pile elements and the like in a preselected pattern in the ground and below the surface of a body of water comprising the combination of a buoyant platform anchorable adjacent the area where the piles are to be driven into the ground, a carriage and an intermediate frame member for supporting the carriage mounted on the platform, the platform and said frame member having alignable apertures, an intersecting series of track means affixed to said platform and pivotally mounted wheel means affixed to the frame member and selectively engagable with various track means of said series of said track means for adjustably moving the frame member either in a linear or acurate path relative to said platform, a drive means for moving the carriage in a linear path relative to the frame member and to a given one of a plurality of fixed positions on the frame member, and pile driving means mounted on the carriage, portions of said pile driving means being movable through the said aligned apertures of the frame member and platform for engaging individual pile elements located within the area defined by the peripheral portions of the aligned apertures of the platform and frame member.

2. An apparatus according to claim 1 wherein said series of track means includes intersecting linearly and arcuately disposed track elements.

3. An apparatus according to claim 2 including switch means disposed at the points of intersection of said track elements for switching the wheel means of the frame member into alignment either with the linearly or arcuately disposed track elements.

4. An apparatus according to claim 1 wherein said drive means includes a pair of chain elements extending across and anchored to said frame member in parallel spaced relation and a sprocket drive shaft means mounted on said carriage for engagement with said chain means.

5. An apparatus according to claim 2 wherein the arcuate track elements are disposed in concentric relation to the aperture of said platform.

6. An apparatus according to claim 2 wherein said linear track elements are arranged in spaced parallel relationship to each other to a lesser extent than the diametrical extent of the circle formed by the arcuately disposed track elements.

7. An apparatus according to claim 1 wherein said pile driving means includes an angularly adjustable support, the angularly adjustable support being adjustable at an angle relative to a vertical plane passing through said carriage and adjacent the aligned apertures of the platform and intermediate frame member.

8. An apparatus for driving piles in a preselected pattern comprising the combination of a platform, a carriage and a frame member for supporting the carriage disposed on the platform, said platform and frame member each having a closed aperture, intersecting parallel and circular track elements affixed to said platform, pivotally mounted wheel means affixed to said frame member, selectively pivotal switch means at the points of intersection of the parallel and circular track elements for switching said pivotally mounted wheel means and frame member either onto said parallel or circular track elements, drive means affixed to said carriage for moving said carriage to a given one of a plurality of fixed positions on said frame member, pile driving means mounted on said carriage, adjustable support means for the pile driving means also mounted on the carriage, said support means being adapted to selectively position the pile driving means in a given one of a number of positions relative to the closed apertures of said platform and said frame member when said apertures have been aligned by movement of the frame member relative to the platform.

9. An apparatus for driving piles in a body of water comprising the combination of a buoyant barge anchorable in spaced relation to and alignment with respect to the area where the piles are to be anchored in the body of water, a carriage and an intermediate frame member for supporting the carriage mounted on the barge, the barge and said frame member each having a closed opening projecting therethrough, intersecting parallel and circular track elements affixed to said barge, pivotally mounted wheel means affixed to said frame member, selectively pivotal switch means located at the points of intersection of the parallel and circular track elements for switching the wheel means and frame member from said parallel track elements to said circular track elements and vice versa, drive means affixed to said carriage for moving said carraige to a given one of a plurality of fixed positions relative to said frame member, pile driving means adjustably mounted on said carriage portions of which can be projected through the apertures of the barge and frame member when the apertures are aligned upon a preselected movement of said frame member relative to the barge and means for controlling the buoyancy of said barge.

References Cited
UNITED STATES PATENTS

| | | | |
|---|---|---|---|
| 201,569 | 3/1878 | Striedinger | 61—46.5 |
| 516,032 | 3/1894 | Symonds | 61—46.5 X |
| 726,780 | 4/1903 | Sproul | 173—43 |
| 1,094,949 | 6/1914 | Taft | 61—53.5 |
| 1,128,039 | 2/1915 | Piercy | 61—46 |
| 2,456,104 | 12/1948 | Anderson | 214—15 |
| 2,628,818 | 2/1953 | Graham | 61—46.5 |
| 3,236,055 | 2/1966 | Tokola | 61—53.5 X |
| 3,244,242 | 4/1966 | Wolff | 175—9 |

DAVID J. WILLIAMOWSKY, *Primary Examiner.*

JACOB SHAPIRO, *Examiner.*